A. ROBERTS.
BY-PRODUCT RECOVERY PROCESS.
APPLICATION FILED APR. 17, 1915. RENEWED OCT. 23, 1918.
1,405,629.
Patented Feb. 7, 1922.
2 SHEETS—SHEET 1.
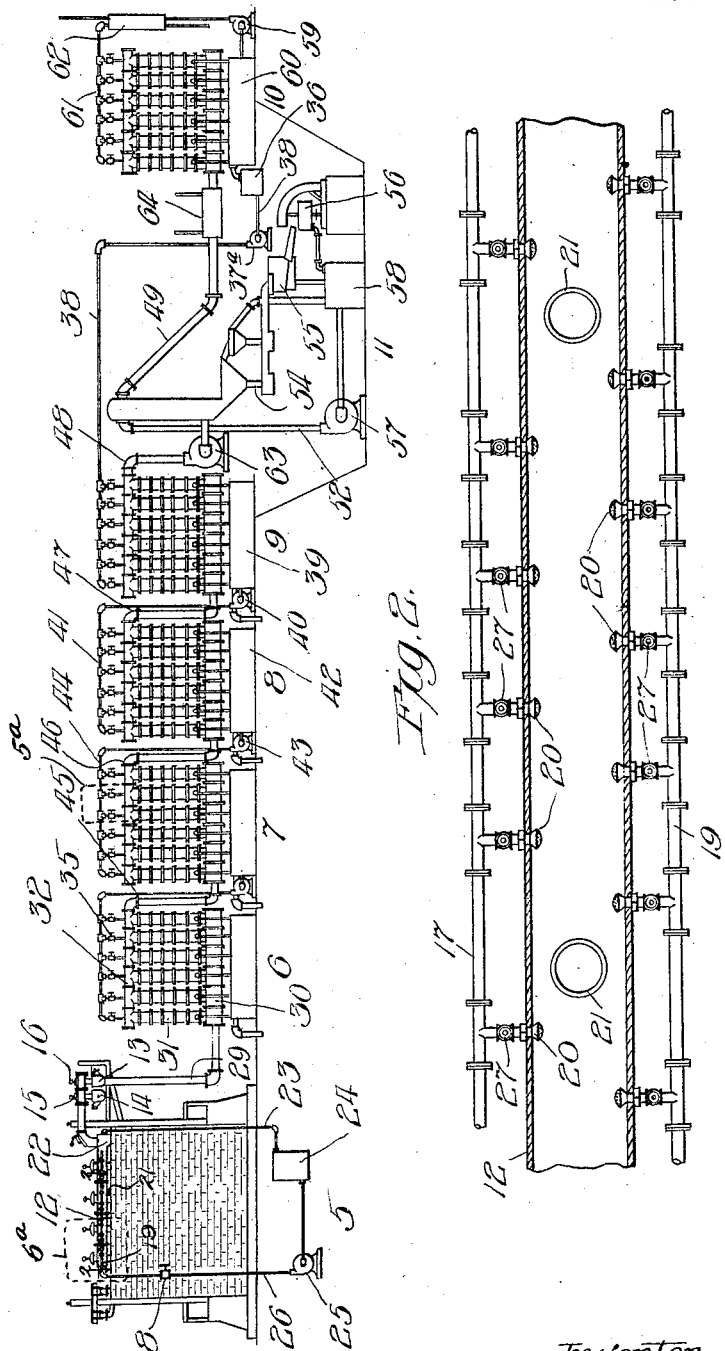

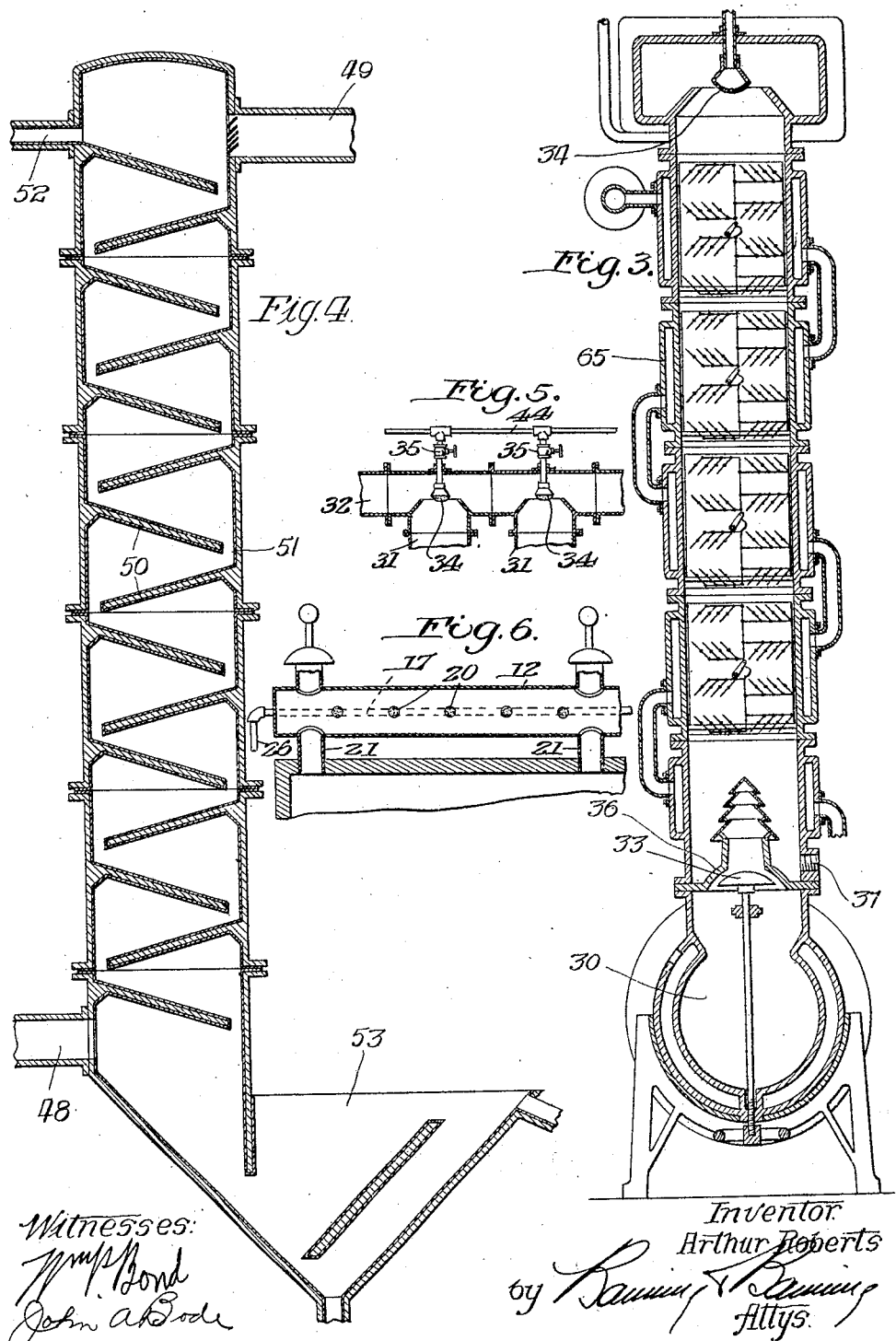

UNITED STATES PATENT OFFICE.

ARTHUR ROBERTS, OF EVANSTON, ILLINOIS, ASSIGNOR, BY MESNE ASSIGNMENTS, TO AMERICAN COKE & CHEMICAL COMPANY, OF CHICAGO, ILLINOIS, A CORPORATION OF MAINE.

BY-PRODUCT-RECOVERY PROCESS.

1,405,629. Specification of Letters Patent. Patented Feb. 7, 1922.

Application filed April 17, 1915, Serial No. 22,147. Renewed October 23, 1918. Serial No. 259,404.

*To all whom it may concern:*

Be it known that I, ARTHUR ROBERTS, a citizen of the United States, residing at Evanston, county of Cook, and State of Illinois, have invented certain new and useful Improvements in By-Product-Recovery Processes, of which the following is a specification.

The present invention has reference to certain improvements in processes for recovery of by-products from coke oven distillate. The process to which the present invention relates is flexible to the extent that it may be used for the recovery of all of the hydrocarbon by-products, which are ordinarily recovered from distillate coal gases, either in gaseous, liquid or solid form.

In the destructive distillation of coal the distillate gases carry a large number of products in gaseous or vaporous form. Some of these products will separate themselves at their respective dew points from a homogeneous mixture of all of the gas distillates.

There are some gaseous or vaporous elements in coal distillate gases which are not condensed and liquefied or solidified by the reduction of temperature which is ordinarily secured in by-product plants. Such for example are ammonia ($NH_3$), sulphur dioxide ($SO_2$), and cyanogen ($CN$) which are generally treated by chemical reactions with other elements to put them into commercial forms that are stable at atmospheric temperatures. The different constituent gases or vapors contained in the distillate gas are associated in the form of a mixture, and as long as the temperature of the distillate gas is maintained high enough all of the constituents of this mixture will remain in gaseous form. If, however, the temperature of the mixture be reduced to the dew point of any of the constituents, then such constituent will saturate the mixture and will be precipitated in the form of a liquor or oil. Thus the particular constituent in question can be separated or removed from the remaining constituents. Having thus removed one of the constituents from the mixture, another constituent having a lower dew point may be removed by another further reduction of temperature to its particular dew point. In this way the several constituents may be fractionally precipitated, and the fractionates may be separately recovered.

As the gases come off from the carbonizing chamber they may or may not carry the several constituents in those proportions desirable for the proper fractional precipitation or condensation. If the constituents are not all present in the proper quantities or proportions, then they cannot be as successfully precipitated at the desired points in the cycle of treatment as by the use of the process herein described. By this is meant that the several reductions of temperature at the several points of the cycle of treatment may not result in the desired fractional condensation of the desired constituents.

From the above it appears that the preliminary treatment of the gases is of great importance to their successful economic treatment later on in the process of fractional condensation. One of the objects of the present invention is to subject the gases immediately after coming off from the carbonizing chamber to a preliminary treatment by injection of certain materials into the gases, so that each of said constituents can subsequently be successfully and completely removed by fractional condensation. This feature of the process consists, in one form of treatment, in injecting into the newly delivered mixture an oil or emulsion so constituted, and in such quantities, that the vaporization of this oil or emulsion will serve to bring the distillate gas into the desired conditions of temperature and sauration of the several constituents.

The preliminary treatment above mentioned, to which the gases are subjected, contemplates generally the injection into the gases freshly delivered from the coke oven, an oil or mixture of oils, or an emulsion, the composition of the said material so injected being such as to improve the condition of saturation of the complex gas as regards those particular constituents which it is desired to subsequently remove by fractional condensation. In case the complex gas coming from the oven contains a constituent which it is desired to remove, but the condition of saturation of the said constituent is relatively low, it may be difficult to properly or completely precipitate the said constituent simply by reduction of the temperature of the complex gas. By injecting into the complex gas, freshly delivered from the oven, an additional amount of a constituent, the condition of saturation of the complex gas, as regards the said constituent, and the dew point of that particular constituent will be definitely fixed, so that upon subsequently reducing the temperature of the complex gas to the said dew point, the said constituent will be precipitated, so that it can be removed.

The injection above referred to may be effected by the injection into the gas freshly delivered, of oil, the same as the constituent in question, or a mixture of oils, or an emulsion containing the oil or oils desired. These oils or this emulsion may be injected into the gas in known quantity and of known composition so that a mixture of gases results which contains the condensable constituents in known percentages. The percentage composition of the condensable constituents being thus fixed, the respective dew points are predictable and therefore it is possible to operate the condensers in such manner as to most perfectly separate the desired constituents from each other. Furthermore, the material so injected will be vaporized by the heat of the gases freshly delivered from the ovens and this vaporization will produce a material cooling effect on the mixture of gases so that a substantial reduction of temperature of the gases will be produced.

If, for example, it is desired to subsequently remove the carbolic oils, and if the gas coming from the oven is not rich in the said oils, it may be desired to inject into the gases freshly delivered from the oven either carbolic oils or a mixture or emulsion including carbolic oils, so as to enrich the gas in such oils. Or for example, if it be desired to remove the benzol during the fractional condensation, it may be desirable to subject the gases freshly delivered from the oven to preliminary treatment by injection of benzol or a mixture of oils or an emulsion including benzol.

Another feature of the invention has reference to the treatment or handling of the gases during the succeeding steps of fractional condensation. This feature of the invention has for its object the arranging of the several condensation steps in such form and order that the various constituents may be brought down in the order of their dew points, and without the necessity of any reheating whatsoever. In this connection another object is to so place the ammonia extractor, when one is used, that the ammonia likewise may be removed at such a point in the process that any subsequent constituents, such as benzol and the like may be thereafter taken off without the necessity of reheating or auxiliary treatment of this kind.

Another object of the invention has reference to such a treatment of the gases as to result in a conservation of the heat with the greatest possible efficiency, so that the introduction of outside heat energy will not be necessary during the entire cycle of treatment.

Other objects and uses of the invention will appear from a detailed description of the same, which consists in the features of invention and various steps of process hereinafter described and set forth.

In the drawings I have illustrated certain apparatuses for carrying into effect my process, as well as a complete arrangement of mechanisms or devices for treating the gas from step to step. It will be understood, however, that the particular mechanical constructions illustrated are not necessarily essential to the successful prosecution of the process, inasmuch as other forms of mechanisms may be adopted.

In the drawings:

Figure 1 illustrates in side elevation diagrammatically a group of elements for prosecuting the successive steps of the process, the elements therein illustrated including the take-off for the coke oven, four condensers, an ammonia saturator, and a fifth condenser for a subsequent step of the process. It will be understood, however, that as far as the features of the invention are concerned a different number of condensers may be used, or the ammonia saturator may be dispensed with, or different forms of condenser and saturator may be substituted;

Fig. 2 shows an enlarged detail of one form of dome for the preliminary treatment of the gases, being a fragmentary horizontal section on line 2—2 of Figs. 1 and 6, looking in the direction of the arrows;

Fig. 3 shows in enlarged detail a section through one form of condenser for the treatment of the gases;

Fig. 4 shows in enlarged detail a section through one form of ammonia saturator for the treatment of the gases;

Fig. 5 shows on enlarged scale and in section a fragmentary portion of the upper part of one of the condensers, being an enlarged sectional drawing of the structure contained within the line 5ª, shown on Fig. 1; and Fig. 6 shows on enlarged scale and in section the portion of the dome and coke oven and connections contained within the line 6ª, shown on Fig. 1.

I will first describe briefly the process of the invention and will then describe more in detail the process as the same may be carried out by means of the several mechanisms or apparatuses illustrated in the drawings.

As the gases come off from the carbonizing chamber they are immediately treated with a spray of oil or emulsion of desired composition according to the constituents which it is desired to introduce into the gas.

I have previously explained that the exact composition of the oil or emulsion with which the gas is treated upon being freshly delivered from the oven, will depend upon the composition of the gas coming from the oven, and also the constituents which it is desired to subsequently remove by fractional condensation. I have also mentioned as instances of such oil or emulsions, the use of carbolic oils and benzol. Manifestly, however, the exact composition of the oil or emulsion or mixture of oils will be determined in each case, according to the requirements of the gas delivered from the oven, and according to the oil which it is desired to remove by condensation. Therefore, I am not limited to the use of carbolic oils or benzol for use in this preliminary treatment.

This oil or emulsion may be sprayed directly into a dome header between the gas ports of the carbonizing chamber and the mains. These mains are for the collection of the gases from the various ovens of the bench. During the run of each oven the composition of its gases changes, being rich at the commencement of the run and gradually becoming leaner as the run progresses. I may, therefore, provide two mains and two or more sets of by-product apparatus so that at an appropriate point in the carbonizing action the gas may be switched over from one set of by-product apparatus to the other set.

The composition of the emulsion or oil which should be sprayed into the newly delivered gas, will be determined largely by the composition of the gas as delivered from the carbonizing chamber, and by the constituents or components which it is desired to recover. This oil or emulsion is sprayed into the gas in sufficient quantities to saturate the gas with certain constituents and to reduce the gas temperature to a point somewhat above the dew point of the heaviest constituent to be recovered.

After the gas which has been subjected to this preliminary treatment leaves the main 13 Fig. 1 through which it is flowing, it enters the first condenser 6 whose function is to bring down or precipitate the heaviest oil or constituent which it is desired to recover. In this condenser the upflowing gas is subjected to a counter current flow of an oil or emulsion at such temperature and in such quantities as to lower the temperature of the gas to the dew point, or slightly below the dew point of the constituent which is to be brought down. For this purpose I may use the oil or constituent which is brought down in the next succeeding condenser 7. This oil has a boiling point below the dew point of the constituent being brought down in the first condenser, and, therefore, this second oil, when so injected, may be vaporized and passed over with the gas into the second condenser, the temperature of the gas being simultaneously reduced to the dew point of the first constituent. Therefore the process may be so practiced that the heat abstracted from the gas for the purpose of lowering its temperature to the dew point of the first constituent is absorbed by the second oil so injected, serving to heat said oil and being absorbed as the latent heat of vaporization of the second oil so injected. For this reason when the process is conducted in this manner the second oil will not be mixed with the first constituent as the latter is brought down, but said second oil will vaporize and be carried over with the gas into the second condenser.

In the second condenser the up-flowing gas is subjected to a downwardly moving spray of oil from the third condenser 8, the dew point of the constituent taken off in the second condenser being higher than that of the constituent taken off in the third condenser. Here likewise the oil from the third condenser will re-evaporate in the second condenser and pass over to the third condenser where it will be brought down by an oil spray from the fourth condenser 9.

From the foregoing it appears that the cooling of the gas current is effected by successive steps or stages, so as to successively bring down the constituents desired, and that each cooling may be accomplished by an oil of a succeeding step. By the use of this arrangement or process the various constituents may be successively brought down without the necessity of reheating the gas at any stage of the process, and without the necessity of diluting or adulterating it by the injection of oils or constituents not contained within its body and the recovery of which is not desired.

Another feature of this invention consists of the ability to maintain the temperature of the pipes and passages throughout the apparatus at the same temperature as the gases circulating through them, by the use of jackets in which are circulated hot or cold oils or liquors, according to the requirements in each respective stage of the recovery and separation of the stable products to be received from the distilled coal gas. By the use of this feature, the pipes and passages can be maintained at the same temperature at each point as the desired temperature of the gases at such point. Therefore, another feature of the invention consists in maintaining the temperature of the pipes or passages of each condenser as nearly as may be at the dew point of the constituent to be brought down in such condenser, thereby preventing the aforementioned deposit of tarry material, and simultaneously insuring a very uniform precipitating action throughout the body of the gas current.

When the ammonia is to be extracted by the use of sulphuric acid in a saturator for the production of ammonium sulphate, the temperature of the gas entering the saturator should ordinarily be lower than that for the precipitation of any other constituent except benzol. Ordinarily, therefore, the ammonia saturator will be placed between the benzol condenser and the condenser for the next preceding constituent. The saturator is shown as being placed between the condenser No. 9 and condenser No. 10 because the gas entering the saturator should have a temperature above the dew point of water vapor to reduce as much as possible the precipitation of water in the sulphuric acid contained within the saturator. In other words, the gas should be discharged from the top of the saturator 54 at a temperature above the dew point of water vapor or above that temperature at which the steam or water vapor will condense.

Referring now to Fig. 1, the coke oven is designated by the numeral 5. In said figure I have illustrated five condensers designated respectively 6, 7, 8, 9 and 10, and I have also illustrated an ammonia saturating plant.

The gas coming off from each oven is collected in a dome or header 12, whence it flows to either of the mains 13 and 14 depending upon the positions of the valves 15 and 16. One of these mains is for the richer gases and the other is for the leaner gases. The recovery plant will ordinarily be in duplicate, one set of apparatus being connected to the main 13 and the other set to the main 14. However, for purposes of simplification, I have illustrated only one set of recovery apparatus, the same being connected to the main 13.

Referring to Figs. 2 and 6 it will be noted that there are provided the pipes 17 and 19 along the sides of the dome 12. Each of these pipes connects to a plurality of spray nozzles 20 located throughout the length of the dome, said nozzles serving to deliver the oil or emulsion to the gas as the same rises through the ports 21 from the carbonizing chamber of the coke oven into the dome above the oven. Ordinarily, some of the spray will not be volatilized in the gas, but will collect in the dome, being prevented from running down through the gas ports 21 by the presence of the flanges 21ª around the upper ends of said ports. From the dome said excess will flow to a depressed portion or trap 22 of the dome, from which it will be returned through the pipe 23 to the receptacle 24. From this receptacle the emulsion is circulated to the pipes 17 and 19 by means of the pump 25 delivering the oil or emulsion through the pipe 26. The valves 27 serve to regulate the flow of oil to the several nozzles, and a valve 28 serves to control the delivery of oil through the pipe 26 to the entire dome. It thus appears that the volume of oil, as well as its distribution in the dome, can be controlled and the return of any excess oil back to the receptacle for recirculation insured.

The details and construction of the dome 12 are fully disclosed in Letters Patent of the United States on improvements in coke oven take-offs, No. 1,198,582, but the construction of the dome is shown in Figs. 2 and 6 herein. The construction of this dome is explained in the preceding paragraph, from which it appears that the oil or emulsion may be injected into the dome from the pipes 17 and 19 by way of the spray nozzles 20.

From the main 13 the gas flows by way of a connection 29 to the manifold 30 in the lower portion of the first condenser. Each condenser is conveniently illustrated as being provided with a plurality of vertical columns 31 leading from the lower manifold 30 to the upper manifold 32. While I have shown in Figs. 3 and 5 certain details of the construction of this condenser, other details of its construction will be found in Letters Patent of the United States on improvements in by-product condensers, No. 1,333,631. The volume of gas passing upward from the lower manifold of each condenser to the upper manifold thereof is controlled by the valves 33 Fig. 3 located at the lower ends of the columns 31. By means of these valves the amount of gas passing up through each column can be regulated according to requirements. Adjacent to the upper end of each column is a spray nozzle 34 Fig. 3, whereby the oil or constituent to be used in the precipitating operation is introduced to that particular column. The valves 35 (Fig. 5) serve to control the flow of oil from the various nozzles 34. Across the lower portion of each column 31 is a partition 36 Fig. 3, on the upper surface of which collects the precipitate, whence it is withdrawn through the port or opening 37.

Each of the vertical columns of the condenser may be provided with a series of baffle plates 28ᵃ, which may be turned into different positions. The spray descending through the column strikes these baffle plates and is thus spread over a large surface, so that a thin film of liquid is presented to the up-flowing stream of gas and this action of the liquid on the gas is largely facilitated by the baffles.

Considering condenser No. 10 all of the oil brought down in the same collects in a receptacle 36. A portion of this oil is drawn by a pump 37ᵃ through a pipe 38 and delivered to the nozzles of condenser No. 9. In said condenser it serves to precipitate the oil being brought down in condenser No. 9 and is itself re-evaporated. In condenser No. 9 the oil brought down is collected in a receptacle 39. From this receptacle a pump 40 delivers a portion through the pipe 41 to the nozzles of condenser No. 8. This oil in turn serves to precipitate the oil in condenser No. 8 and is itself re-evaporated and passes back to condenser No. 9. The oil brought down in condenser No. 8 collects in the receptacle 42, whence a portion is drawn by the pump 43 and delivered through the pipe 44 to the nozzles of condenser No. 7. The action in condensers Nos. 7 and 6 is similar to that just described for condensers 10, 9 and 8.

After the gas has been treated in condenser No. 6 it flows by the connection 45 to the lower manifold of condenser No. 7. From the upper manifold of condenser No. 7 it passes by the connection 46 to the lower manifold of condenser No. 8, and from the upper manifold of condenser No. 8 by the connection 47 to the lower manifold of condenser No. 9.

From the condenser No. 9 the gas passes by the connection 48 to the ammonia saturator 11. The construction of this saturator is shown in Fig. 4, but the other details of its construction are more fully shown in my Letters Patent of the United States on improvements in ammonia saturators, No. 1,331,784. In the said saturator the gas enters at the lower end and passes up to a discharge connection 49 at its upper end. A series of baffles 50 extend across the saturator from its opposite sides, said baffles slanting downward in opposite directions. Adjacent to the lower end of each baffle is the relatively small opening 51. The acid is introduced through the connection 52 at the upper end of the saturator, flowing downwardly over the successive baffles and being ultimately discharged into the hopper 53. The volume of acid is preferably adjusted so as to substantially close the openings 51, so that the up-flowing gas is forced to break through the acid at each of said openings. The ammonium sulphate crystals collect in the hopper whence they may be withdrawn through the connection 54, ultimately finding their way to a drain table 55 and centrifugal 56. A pump 57 circulates the acid from the receptacle 58 up through the pipe 52 and into the saturator.

The condenser 10 is provided with a pump 59 which draws oil from the receptacle 36 or from the auxiliary receptacle 60, delivering the same through the pipe 61 to the nozzles of that condenser. In order to bring the oil so delivered to the nozzles of the condenser 10 to the proper temperature I have illustrated a cooler 62 surrounding the pipe 61 throughout a portion of its length, said cooler bringing the oil to the desired temperature before the same is delivered to the nozzles of this condenser. Ordinarily, the temperature desired will be below 18° C. It is generally desired to reduce the temperature of both gas and circulating oil used for cooling the gas in condenser No. 10 below the temperature of the condensation of water and a greater efficiency is obtained in the recovery of the light oils in condenser No. 10.

In order to insure a proper flow of gas through the saturator ordinarily there will be provided an exhauster 63 in the connection 48 which leads from condenser No. 9 to the saturator, and ordinarily also a cooler 64 will be installed in the connection 49 between the saturator and condenser No. 10. It will be understood that the temperature at which benzol will be precipitated is considerably below that of the ordinary atmosphere.

In Fig. 3 it will be noted that each of the condenser sections is provided with a jacket 65. When it is desired to secure a more perfect operation of the apparatus and process a suitable liquor may be circulated through the jackets of each condenser so as to maintain said condenser at the proper temperature.

The number, character, and composition of the oils separated will depend upon the number of fractional precipitation stages, the temperature maintained at each stage, the constituents contained in the distillate gases, etc. Ordinarily the distillate oils are classified as heavy, middle, and light. The heavy oils which usually include anthracene, pyrene, and picene, come off between 230° and 520° C.; the middle oils which usually include carbolic acid, naphtha solvent, creosote, and naphthalene, come off at from 170° to 230° C.; and the light oils which usually include benzol, toluol, and xylol come off below 170° C.

As an example of process, embodying the features of my invention, let it be assumed that anthracene oil, creosote oil, carbolic oils, crude light oils, and light oils are to be recovered from the distillate gases. Let it also be assumed that the gases coming from the oven are relatively weak in carbolic oils and light oils. In such a case it may be desirable to use the preliminary treatment as the gases come from the oven and before they are delivered to the first condenser. Therefore, it will be desirable to inject into the gases coming from the oven a mixture or emulsion of oils containing carbolic oils and light oils. This mixture of oils or emulsion may also contain ammoniacal liquor saturated with fixed ammonia.

The anthracene oil will be brought down by condensation at temperatures of 280–285° C., the creosote oil will come down at temperatures of 255–280° C., the carbolic oils will come down at temperatures of 165–255° C., the crude light oils will come down at temperatures of 105–165° C., and the light oils will come down at temperatures below 105° C. Assuming that the temperature of the gases leaving the oven and ascending through the ports 21 into the dome 12 approximates 1100° C., the said temperature will probably be reduced by the spray of the emulsion in the preliminary treatment to approximately 500° C. At this temperature the gas will pass over through the connection 29 in Fig. 1 to the lower portion of the first condenser 6.

The creosote oils collecting in the tank of the second condenser 7 will have boiling points of 255–280° C. The gas entering the first condenser 6 has a temperature of approximately 500° C. and has to be reduced to a temperature of approximately 280° C. in order to bring down all of the anthracene oil. That is to say, the temperature of the gas passing from the first condenser to the second condenser by the connection 45 will be approximately 280° C. It, therefore, follows that if some of the creosote oils collected in the tank of the second condenser 7 be returned to the first condenser and injected into the same through its spray nozzles, the creosote oil so injected will be reevaporated and carried back by the connection 45 to the lower end of the second condenser 7. Simultaneously, however, the temperature of the gas ascending through the first condenser 6 will be lowered to approximately 280° C., thus causing a precipitation in the first condenser 6 of all of the oils which will come down at temperatures above 280° C. The creosote oil used during this spraying operation will not become mixed or mingled with the anthracene oil, because the creosote oil sprayed in the above manner will be immediately re-evaporated and returned in vaporous condition through the connection 45 to the second condenser 7.

The gas entering the second condenser 7 from the connection 45 has a temperature of approximately 280° C., and has to be reduced in the second condenser to a temperature of approximately 255° C. This means that the gas leaving the top end of the second condenser 7 and flowing by way of the connection 46 to the third condenser 8 will have a temperature of approximately 255° C. In order to reduce the temperature in the second condenser 7 from 280° C. down to 255° C. a spray is used in the said condenser composed of an oil which evaporates at a temperature of 255° C. or less. This oil may be found in the third condenser 8, the tank 42 of which collects the carbolic oils which come down at temperatures of 165–255° C. Consequently, a portion of the oils from the tank 42 of the third condenser 8 may be returned over the connection 44 to the spray nozzles of the second condenser 7. The carbolic oils so returned to the spray nozzles of the second condenser will reduce the temperature of the gases in the second condenser to 255° C., thereby precipitating in the second condenser the creosote oils which come down between 280° C. and 255° C. Simultaneously, the carbolic oils so injected as a spray will be re-evaporated in the second condenser and returned by connection 46 to the third condenser 8.

The carbolic oils are brought down in the third condenser 8 by reducing the temperature of the gas from 255° C. as it enters the third condenser 8 from the connection 46 to 165° C. as it leaves the third condenser 8 through the connection 47. This reduction of temperature may be secured by the use of the crude light oils collected in the tank 39 of the fourth condenser 9 as a spray. These crude light oils, coming down at temperatures of 105–165° C. will be re-evaporated in the third condenser 8 and returned to the fourth condenser 9 by the connection 47.

The crude light oils may be brought down in the fourth condenser 9 by reducing the temperature of the gas passing through said condenser from 165° C. as it enters the fourth condenser through the connection 47 to 105° C. as it leaves the fourth condenser through the connection 48. This temperature reduction may be secured by use of the spray in the fourth condenser, which spray is composed of oils coming down at temperatures below 105° C. Such for example are the light oils which come down in the fifth condenser 10 at temperatures below 105° C. Some of the light oils collecting in the tank 60 of the fifth condenser 10 may be returned over the connection 38 to the spray nozzles of the fourth condenser 9 to thereby reduce the temperature of the gases leaving the fourth condenser to approximately 105° C., the light oils being simultaneously re-evaporated and delivered from the fourth condenser 9 through the connection 48. These light oils so returned eventually find their way to the fifth condenser 10 after having passed through the saturator 11.

The light oils collecting in the tank 60 of the fifth condenser 10 are brought down in said condenser by the use of a suitable spray. Such a spray may be composed for example of a portion of the light oils from the tank 60, the said portion being delivered by a pump 59 through a cooler 62 to the spray nozzles. The cooler 62 will lower the temperature of the oils to such a degree that they will precipitate all of the light oils coming over by way of the connection 49.

By locating the saturator 11 in the system at such a point that the gases passing therethrough remain at a temperature above the dew point of water vapor, any water vapor contained in the said gases will be maintained in the condition of a vapor and will not be precipitated in the saturator. Consequently, the sulphuric acid in the saturator will not become diluted by the condensation of such water vapor.

While I have in the above paragraphs mentioned in some detail a specific instance of an application of the processes of the present invention, still it will be understood that I do not in anywise limit myself to the particular example mentioned, nor do I limit myself to the particular temperature, constituents, and composition of emulsion or spray mentioned in the said example. On the other hand, it will be understood that I contemplate within the scope of my invention the preliminary treatment of the gases by injection thereinto of oils or emulsions of such composition as to improve the condition of saturation of any oils which are to be subsequently removed by condensation; it will also be understood that I contemplate within the scope of my invention the fractional removal of the various constituent oils by successive lowering of the temperature of the complex gas; it will also be understood that I contemplate within the scope of my invention the use of sprays for securing the successive lowering of temperatures, and it will also be understood that I contemplate within the scope of my invention the direct process for the removal of the oils and the ammonia constituent by placing the ammonia saturator at such a point in the cycle of gas treatment that the removal of the various oils and the removal of the ammonia may be effected in a step-by-step manner, making use of a step-by-step reduction in gas temperatures.

I claim:

1. The process for the recovery of by products from coke oven distillate gases, which consists in subjecting the hot gases freshly delivered from the coke oven and at substantially the temperature at which said gases leave the oven to a preliminary treatment by the injection thereinto of a suitable medium for the purpose of saturating it with certain constituents and controlling its temperature independently of subsequent condensation steps, and which consists in thereafter progressively and abruptly lowering the temperature of the gases in stages by sprays without reheating between the stages, the temperature at each stage being substantially the same as the dew point of the vapor of the respective constituent recovered at such stage, the spray for each stage consisting of oils which are of substantially the same composition as oils subsequently removed at a later stage of the process, said oils being reevaporated while at the same time serving to lower the dew point of the complex distillate gases to thereby precipitate one of the constituents of said gases, substantially as described.

2. The process for the recovery of by products from coke oven distillate gases, which consists in subjecting the hot gases freshly delivered from a coke oven and at substantially the temperature at which said gases leave the oven to a preliminary treatment by the injection thereinto of a suitable medium, the volume and nature of the medium independently of subsequent condensation steps so injected being determined so as to chill the gases to the temperature slightly above the dew point of the vapor of the heaviest by-product to be recovered and so as to saturate the gases with by-products to be recovered, and which consists in thereafter progressively and abruptly lowering the temperature of the gases in stages by sprays without reheating between the stages, the temperature at each stage being substantially the same as the dew point of the vapor of the respective constituent to be recovered at such stage, and the spray for each condenser consisting of oils which are of substantially the same composition as the oils subsequently removed at a later stage of the process, said oils being reevaporated while serving at the same time to lower the dew point of the complex distillate gases to thereby precipitate one of the constituents of said gases, substantially as described.

ARTHUR ROBERTS.

Witnesses:
THOMAS A. BANNING, Jr.,
FRANCES M. FROST.